United States Patent Office 3,036,051
Patented May 22, 1962

3,036,051
PROCESSING VULCANIZABLE ELASTOMERS WITH NITROSOARYLAMINOMETHYLIMIDES
John J. D'Amico, Nitro, W. Va., assignor to Monsanto Chemical Company, St. Louis, Mo., a corporation of Delaware
No Drawing. Original application Sept. 30, 1957, Ser. No. 686,855, now Patent No. 2,927,930, dated Mar. 8, 1960. Divided and this application Sept. 29, 1958, Ser. No. 767,076
4 Claims. (Cl. 260—85.3)

The present invention relates to processing vulcanizable elastomers with nitrosoarylaminomethylimides and more particularly to reacting vulcanizable elastomers with the aforesaid compounds at elevated temperatures.

It has long been known that nitroso mixed aromatic aliphatic amines having a nitroso substituent on the aromatic ring have useful properties in the industrial arts but these compounds are of limited thermal stability. The optimum stability is apparently achieved by selecting methyl as the aliphatic substituent but thermal stability is still marginal. However, it has now been discovered that substitution of a hydrogen atom on the methyl group by a radical derived from an imide increases thermal stability.

The new compounds may be regarded as derivatives of N-methyl C-nitroso aromatic amines in which nitrogen replaces the hydrogen in its methyl group to provide a structure in which two nitrogen atoms are linked by a methylene group, one nitrogen being further linked to a nitroso substituted aromatic group and the second being part of an imide ring, the methylene group replacing imidohydrogen. By an imide ring is meant a structure in which the nitrogen is part of two acid groups which acid groups are connected to form a closed ring. It will be noted that imido is not used synonymously with imino but is used in its usual and more restricted sense to mean a structure in which the nitrogen is part of an acid group.

An imide may be defined as a compound derived from acid anhydrides in which oxygen is replaced by nitrogen. In conformity with this definition the amide nitrogen in the compounds of the present invention may be linked to C=O or C=S groups, these being residues of acid groups after removal of OH. Furthermore, the manner in which the residues of the two acid groups are connected significantly influences the properties. They are preferably connected through two carbon atoms which are part of an aromatic ring. Further substitution is permissible in either or both aromatic rings, particularly halogen, lower alkyl, lower alkoxy and nitro substituents.

It is evident from the foregoing that one valence of the amino nitrogen is satisfied by methylene and a second valence by a nitro substituted aromatic radical. The remaining valence may be satisfied by hydrogen or a nitroso group or by an organic substituent, as for example, alkyl, cyanoalkyl, carboalkoxyalkyl or carboxyalkyl. The radicals are listed essentially in order of decreasing preference. In general, presence of an organic substituent reduces reactivity of the compounds towards elastomers.

Compounds typical of the new class comprise

N-(p-nitrosoanilinomethyl)-maleimide,
N-(3-methyl-4-nitrosoanilinomethyl)-phthalimide,
4-nitro-N-(p-nitrosoanilinomethyl)-phthalimide,
4-chloro-N-(p-nitrosoanilinomethyl)-phthalimide,
4-chloro-N-(3-chloro-4-nitrosoanilinomethyl)-phthalimide,
N-(p-nitrosoanilinomethyl)-thiophthalimide,
N-(p-nitrosoanilinomethyl)-dithiophthalimide,
N-(p-nitrosoanilinomethyl)-bicyclo[2.2.1]-hept-5-ene-2,3-dicarboximide,
N-(p-nitrosoanilinomethyl)-4,5-dimethyl-1,2,3,6-tetrahydrophthalimide,
N-(p-nitrosoanilinomethyl)-tetrachlorophthalimide,
3-(p-nitrosoanilinomethyl)-2,4-thiazolidine-dione and
bis-(p-nitrosoanilinomethyl)-pyromellitimide.

The new compounds may be prepared by reacting the corresponding bases with nitrosating agents. The bases required as intermediates are either known compounds or may be prepared in known manner from the imides. A method described by Sachs, Ber. 31, pp. 3232, 3235 (1898) is suitable. According to this method an imide is preliminarily reacted with formaldehyde to produce an imido-oxy-methylene compound which is converted to the corresponding halide and further treated with the amine. The imido-oxy-methylene compound may be reacted directly with the aromatic amine in which case water is removed from the reaction as a by-product in place of the hydrogen halide split off when employing the method of Sachs. See Winstead et al., J. Am. Chem. Soc. 77, 1913 (1955) and Heine et al., ibid, 78, 672 (1956) for suitable intermediates and methods for their preparation. The imido-oxy-methylenes form readily by reacting formaldehyde with an imide. A typical preparation is described in Example 1.

The new compounds form salts with strong inorganic acids and metal salts and form metal salt complexes. These derivatives are also useful and are encompassed by the present invention. Salts of such acids as hydrochloric and orthophosphoric may be prepared by methods previously described for preparation of salts of nitrosoaryl amines. Metal salts are formed by adding a soluble salt of the desired metal to an aqueous solution of the nitrosoamine. Metallic salt complexes may be prepared by reacting nitrosoaryl amine in solution in an organic solvent with a solution of the metal salt. Some metal salts which may be cited as examples are $CuCl_2$, $FeCl_3$, $NiCl_2$ $AgCl_2$, $CdCl_2$, $MnCl_4$ and $CaCl_2$.

EXAMPLE 1

*N-(p-Nitrosoanilinomethyl)Phthalimide*

To a stirred suspension of 147.2 grams (1.0 mole) of phthalimide in 1000 ml. of ethyl alcohol is added in one portion 108 grams (1.23 moles) of 37% formaldehyde. The stirred mixture is brought to reflux (75–80° C.) and 105 grams (1.13 moles) of aniline added in one portion. The mixture is stirred and heated at refluxing temperature (75–80° C.) for one hour. After cooling to 10° C. the yellow solid which had precipitated is separated by filtering from solution, washed with water and air dried to obtain 241 grams (95.3% yield) of N-anilinomethyl phthalimide, M.P. 143–144° C. Substitution of 800 ml. of water for 1000 ml. of ethyl alcohol in the foregoing procedure and heating at 95–100° C. for one hour gives slightly higher yield of the same product.

To 439 grams of a 41.7% solution of hydrogen chloride in methyl alcohol (5 moles) is added at 5° C. 126 grams (0.5 mole) of anilinomethyl phthalimide. After cooling to 5° C. 40 grams (0.56 mole) of 97% sodium nitrite is added in one portion. External cooling is then removed after which the temperature rises to 25° C. in one hour. Stirring is continued for 4 hours at 25–40° C. The temperature reaches 40° C. after 3.5 hours, then slowly declines to 25° C. The mass is then added to 1500 grams of an ice-water mixture. Concentrated ammonium hydroxide is added to the batch at 5–10° C. until a pH of has been reached. Stirring is continued at 5–10° C. for one additional hour. The green solid which has formed is filtered, washed with a liter of water and air dried. There is obtained 140.5 grams, essentially quantitative yield, of the desired product, M.P. 183–185° C. The product purified by recrystallization melts at 185–187° C. Below is the analysis as compared to the values calculated for $C_{15}H_{11}N_3O_3$:

|  | Calculated, percent | Found, percent |
|---|---|---|
| Hydrogen | 3.94 | 4.15 |
| Carbon | 64.05 | 64.18 |
| Nitrogen | 14.94 | 15.21 |

If desired the intermediate N-nitroso compound may be isolated. A glass reaction vessel is charged with 25.3 grams (0.1 mole) of anilino-methyl-phthalimide and 340 ml. of ethyl alcohol. The charge is stirred and heated to 70° C. for a few minutes and then cooled to 5° C. There is then added in one portion 12 ml. of concentrated hydrochloric acid and 8 grams (0.11 mole) of 97% sodium nitrite dissolved in 12 ml. of water. An exothermic reaction sets in causing a temperature rise from 5 to 20° C. After stirring at 10–20° C. for one hour, 200 ml. of water is added and stirring continued for one-half hour. The precipitate is filtered, washed with water until neutral to litmus and air dried at 20–30° C. N-(N-Nitrosoanilinomethyl)phthalimide is obtained in a yield of 96.1%, M.P. 151–154° C. After recrystallization from benzene the M.P. is 154–156° C. Analysis gives 14.64% nitrogen as compared to 14.94% calculated for $C_{15}H_{11}N_3O_3$.

The new compounds are useful adjuvants in the heat processing of butyl rubber. Butyl rubber is the well recognized and commonly employed generic name applied to a variety of elastic copolymers of isobutylene and small quantities of diolefins. The diolefins are usually selected so to produce a final product which possesses only a small percentage of the unsaturation of natural rubber. The content of combined diolefin hydrocarbon commonly is not greater than 15%.

Heating butyl rubber without curatives in the presence of small amounts of the compounds of this invention effects a reaction which not only increases the modulus of elasticity of the vulcanizates markedly but also retains reasonable elongations. The heating should be above 121° C. (250° F.) and preferably at 149–188° C. (300–370° F.) with heating times ranging from one minute to 16 hours. The compositions are masticated either during or after the heat treatment.

As illustrative of the properties of the new compounds typical examples are admixed with butyl rubber in the following manner: The additive is incorporated with 400 grams of butyl rubber on a mill at 50° C. in a period of about two minutes. Milling is continued for five minutes, cutting several times from each side to insure good dispersion. The mixture so obtained together with 1000 grams of butyl rubber is charged to a pre-heated Banbury mixer at 150° C. The batch is mixed for one minute at 120 p.s.i.; thereupon carbon black and stearic acid are added and mixing continued for an additional nine minutes at 150° C. Proceeding in the manner described, compositions are compounded comprising:

|  | Parts by weight | | | | | | | |
|---|---|---|---|---|---|---|---|---|
| Butyl rubber | 100 | 100 | 100 | 100 | 100 | 100 | 100 | 100 |
| Carbon black | 50 | 50 | 50 | 50 | 50 | 50 | 50 | 50 |
| Stearic acid | 1 | 1 | 1 | 1 | 1 | 1 | 1 | 1 |
| N-(3-Chloro-4-nitroso-anilino-methyl)-phthalimide | ---- | 0.1 | 0.2 | 0.3 | 0.5 | 0.75 | 1.0 | 1.5 |

The butyl rubber is a copolymer of isobutylene and isoprene having a Mooney viscosity in the range of 61–70° C. and mole percent unsaturation in the range of 1.5–2.0, and the carbon black is a mixture of 15 parts of high abrasion furnace black and 35 parts medium processing channel black. Final compounding of vulcanizable stocks is effected on a mill at 50° C. with the roll clearance set at 0.014″. From the Banbury 225 gram portions are blended on the back roll for 15 seconds, 7.5 grams zinc oxide, 1.5 grams 2,2′-dithiobisbenzothiazole, 1.5 grams tetramethylthiuram disulfide and 3.0 grams sulfur are added in 2½ minutes. The mass is then blended two minutes on the back roll by rolling into a cylinder and passed through edgewise nine times with the mill rolls opened to 0.020″. Vulcanization is effected by heating in a press 45 minutes at 144° C. (291° F.). The physical properties are summarized in Table I.

TABLE I

| Amount of N-(3-Chloro-4-nitroso-anilino-methyl)-phthalimide | Modulus of elasticity in lbs./in.² at 300% elongation | Tensile at break in lbs./in.² | Ult. elong., percent | Torsional hysteresis |
|---|---|---|---|---|
| None | 1,180 | 2,500 | 580 | .45 |
| 0.1 | 1,460 | 2,560 | 530 | .38 |
| 0.2 | 1,410 | 2,700 | 540 | .38 |
| 0.3 | 1,510 | 2,650 | 500 | .30 |
| 0.5 | 1,950 | 2,750 | 450 | .26 |
| 0.75 | 1,960 | 2,610 | 400 | .22 |
| 1.0 | 2,080 | 2,800 | 400 | .19 |
| 1.5 | 2,030 | 2,800 | 420 | .21 |

Torsional hysteresis was determined at room temperature with an apparatus which embodies a torsion pendulum. The sample of rubber tested supplies the force to restore the pendulum when it is deflected. The logarithmic decrement of the observed amplitude is recorded.

As further illustrative of their valuable properties, tests are carried out employing 0.5 part by weight of the nitrosoamine per 100 parts of butyl rubber. The mixing, compounding, curing and testing are all as described above. The increased modulus and lower hysteresis as compared to the untreated control are evident from the data recorded below:

TABLE II

| Nitrosoamine | Modulus of elasticity in lbs./in.² at elongation of 300% | Torsional hysteresis |
|---|---|---|
| None | 1,340 | .39 |
| N-(p-Nitrosoanilinomethyl)phthalimide | 2,000 | .23 |
| N-(3-chloro-4-nitrosoanilinomethyl)phthalimide | 2,070 | .23 |
| N-(3-bromo-4-nitrosoanilinomethyl)phthalimide | 2,210 | .22 |
| N-(N-methyl-p-nitrosoanilinomethyl)phthalimide | 1,640 | .28 |
| N-(3-chloro-N,4-dinitroso-anilinomethyl)phthalimide | 1,920 | .25 |
| N-[N-ethyl-N-(p-nitrosoanilino)-methyl]phthalimide | 1,720 | .31 |
| N-[N-(2-cyanoethyl) - 4-nitrosoanilinomethyl]-phthalimide | 1,540 | .35 |
| Methyl N-(p-nitrosophenyl)-N-(phthalimidomethyl)-β-alaninate | 1,750 | .26 |

Again, employing 0.5 part by weight of the nitrosoamine per 100 parts of butyl rubber and following the mixing, compounding, curing and testing described above except that the butyl rubber and nitrosoamine were mixed and heated in the Banbury for three minutes instead of one minute, the results are as follows:

TABLE III

| Nitrosoamine | Modulus of elasticity in lbs./in.$^2$ at elongation of 300% | Torsional hysteresis |
|---|---|---|
| None | 1,220 | .47 |
| N-(p-nitrosoanilinomethyl)-succinimide | 1,650 | .34 |
| 5-[3-(3-chloro-4-nitrosophenyl)-3-(phthalimidomethyl)ureido] o-tolyl isocyanate | 1,550 | .39 |
| α-{p-[3-(3-chloro-4-nitroso)-3-(phthalimidomethyl)ureido]-phenyl} p-tolyl isocyanate | 1,550 | .39 |
| 3-chloro-4-nitroso-N-(phthalimidomethyl) carbanilide | 1,550 | .38 |
| Zinc salt of N-(4-oxo-2,5-cyclo-hexadiene-1-ylideneiminomethyl)phthalimide | 1,810 | .30 |

While the preferred method of using the new compounds is to mix with the raw butyl rubber and heat before adding pigments, significant improvements are obtained in the presence of other ingredients. Of course, at least one ingredient necessary for vulcanization must be omitted during the heating period because the process may be carried out at temperatures equal or higher than vulcanizing temperatures. As illustrative of the effect of varying the mixing procedure the nitrosoamine is added on a 50° C. mill in the manner described. In one procedure the mixture is charged together with additional butyl rubber to the Banbury and mixed one minute at 125° C. after which carbon black is added. In a second procedure butyl rubber, butyl rubber admixed with nitrosoamine and carbon black are charged together to the preheated Banbury and heated one minute at 125° C. In the third case the butyl rubber and carbon black are charged to the Banbury, heated one minute at 125° C. and the mixture of butyl rubber and nitrosoamine added. In each case the admixture of butyl rubber, nitrosoamine and carbon black are mixed and heated for nine minutes, the maximum temperature being kept at 150–160° C. by suitable cooling. Final compounding and curing are carried out in the manner already described. The results, employing 0.5 part of nitrosoamine, are recorded below:

TABLE IV

Butyl rubber and nitrosoamine premixed one minute at 125° C. before addition of carbon black

| Nitrosoamine | Modulus of elasticity in lbs./in$^2$ at 300% elongation | Tensile at break in lbs./in$^2$ | Ult. elong., percent | Torsional hysteresis |
|---|---|---|---|---|
| None | 1,490 | 2,650 | 530 | .36 |
| N-(p-nitrosoanilinomethyl)phthalimide | 2,000 | 2,900 | 450 | .23 |
| N-(3-chloro-4-nitrosoanilinomethyl)-phthalimide | 2,200 | 2,900 | 400 | .18 |

Butyl rubber, nitrosoamine and carbon black added together

| None | 1,460 | 2,630 | 550 | .40 |
| N-(p-nitrosoanilinomethyl)phthalimide | 1,640 | 2,720 | 480 | .36 |
| N-(3-chloro-4-nitrosoanilinomethyl)-phthalimide | 1,920 | 2,820 | 450 | .24 |

Butyl rubber and carbon black premixed one minute at 125° C. before addition of nitrosoamine

| None | 1,460 | 2,770 | 550 | .37 |
| N-(p-nitrosoanilinomethyl)phthalimide | 1,660 | 2,650 | 480 | .32 |
| N-(3-chloro-4-nitrosoanilinomethyl)phthalimide | 1,870 | 2,770 | 440 | .23 |

As illustrative of the results with non-black fillers, butyl rubber is admixed with N-(3-chloro-4-nitrosoanilinomethyl)-phthalimide on a 50° C. mill. The mixture and a sample of butyl rubber alone are then heated four hours at 150° C. in a circulating air oven. The compositions are put back on the mill and fillers added to prepare compositions comprising:

|  | Parts by weight | |
|---|---|---|
| Butyl rubber | 100 | 100 |
| Silica | 40 | 40 |
| Titanium dioxide | 35 | 35 |
| N-(3-chloro-4-nitrosoanilinomethyl)-phthalimide |  | 0.5 |

The compositions so prepared are returned to the oven and heated four hours at 150° C. Vulcanizable stocks are compounded by adding stearic acid 2, zinc oxide 5, 2,2'-dithiobisbenzothiazole 1, tetramethylthiuram disulfide 1, and sulfur 2 parts. After curing 45 minutes the physical properties are as follows:

TABLE V

|  | Modulus of elasticity in lbs./in.$^2$ at elongation of 300% | Tensile at break in lbs./in.$^2$ | Ult. elong., percent |
|---|---|---|---|
| Control—no nitrosoamine | 250 | 1,870 | 950 |
| Heated with nitrosoamine | 1,030 | 1,580 | 460 |

Reaction of butyl rubber with the new compounds improves its adhesion to tire cord. Alternatively, the cord may be treated, as for example, by dipping into a solution or dispersion of the nitrosoamine, embedded in a vulcanizable elastomer composition and the composition vulcanized to obtain a laminated fiber. Rayon tire cord is passed through an aqueous dispersion of the nitrosoamine, dried and incorporated into a composition comprising:

```
                                                    Parts by weight
Butadiene-styrene copolymer rubber _____ 100
Carbon black _____  25
Zinc oxide _____   5
Saturated hydrocarbon softener _____ 7.5
Sulfur _____   3
2,2'-dithiobisbenzothiazole _____ 1.5
```

After vulcanizing by heating 30 minutes at 158° C. the following adhesion values are obtained by measuring pull-out with a Dillon tester.

| Nitrosoamine | Pull-out value in pounds |
|---|---|
| None—control | 9–12 |
| N-(p-nitrosoanilinomethyl)phthalimide | 18.5 |
| N-(3-chloro-4-nitrosoanilinomethyl)phthalimide | 17.0 |
| N-(3-bromo-4-nitrosoanilinomethyl)phthalimide | 15.3 |
| N-(N-methyl-p-nitrosoanilinomethyl)phthalimide | 15.5 |
| N-[N-ethyl-N-(p-nitrosoanilino)methyl]-phthalimide | 16.5 |
| N-[N-(2-cyanoethyl)-4-nitrosoanilinomethyl]-phthalimide | 15.6 |
| Methyl N-(p-nitrosophenyl)-N-(phthalimido-methyl)-β-alaninate | 16.5 |
| N-(3-chloro-N-dinitrosoanilinomethyl)-phthalimide | 17.0 |

Adhesion of nylon cord is also enhanced but to a lesser degree. However, the new compounds have the valuable property of inhibiting heat degradation of nylon cord. The breaking strength of nylon cord is less than one-third the original value after heating 42 hours in an air oven at 150° C. but the degradation is much less after dipping the cord into a dispersion of one of the new nitrosoamines. Typical results are recorded below employing nylon cord having a breaking strength of about 32 pounds.

| Nitrosoamine | Breaking strength after aging 42 hrs. at 150° C. |
|---|---|
| None—control | 9.5 |
| N-(p-nitrosoanilinomethyl)phthalimide | 27.1 |
| N-(3-chloro-4-nitrosoanilinomethyl)phthalimide | 22.2 |
| N-(3-bromo-4-nitrosoanilinomethyl)phthalimide | 20.5 |

It is intended to cover all changes and modifications of the examples of the invention herein chosen for purposes of disclosure which do not constitute departures from the spirit and scope of the invention.

The present application is a division of parent application Serial No. 686,855, filed September 30, 1957, now Patent Number 2,927,930.

What is claimed is:

1. The process which comprises heating within the range of about 250° F.–370° F. for a time within the range of about one minute to sixteen hours vulcanizable rubbery copolymer of at least 85% isobutylene and a small amount, not more than 15% of diolefin hydrocarbon, said copolymer having incorporated therein a small amount of a nitrosoarylaminomethylimide characterized by the structure

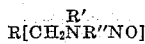

where R is an organic amino substituent, in which nitrogen is linked to the methylene group in the brackets, selected from the group consisting of

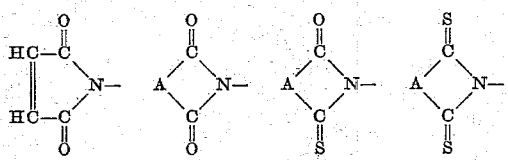

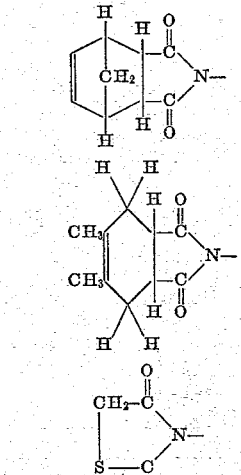

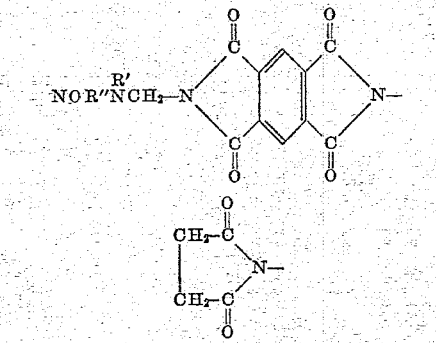

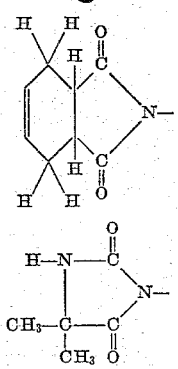

where A represents a radical selected from the group consisting of ortho-phenylene and substituted ortho-phenylene wherein the substituents are selected from the group consisting of halogen, lower alkyl, lower alkoxy and nitro, R' is selected from the group consisting of hydrogen, lower alkyl, nitroso, cyanoethyl, lower alkyl carboxy ethyl and carboxy ethyl groups, R" is selected from the group consisting of phenyl and substituted phenyl wherein the substituents are selected from the group consisting of halogen, lower alkyl, lower alkoxy and nitro, any vulcanizing agents, if present, being present in amounts insufficient to cause vulcanization whereby the modulus of the subsequently cured product is increased.

2. The process which comprises heating and mixing within the range of about 300° F.–370° F. for a time within the range of about one to twelve minutes vulcanizable rubbery copolymer of at least 85% isobutylene and a small amount, not more than 15% of diolefin hydrocarbon, said copolymer having incorporated therein a small amount of a nitrosoarylaminomethylimide characterized by the structure

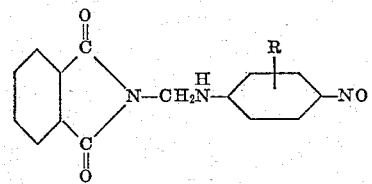

where R represents halogen, any vulcanizing agents, if present, being present in amounts insufficient to cause vulcanization whereby the modulus of the subsequently cured product is increased.

3. The process which comprises heating and mixing within the range of about 300° F.–370° F. for a time within the range of about one to twelve minutes vulcanizable rubbery copolymer of at least 85% isobutylene and a small amount, not more than 15% of diolefin hydrocarbon, said copolymer having incorporated therein a small amount of N-(p-nitrosoanilinomethyl)phthalimide, any vulcanizing agents, if present, being present in amounts insufficient to cause vulcanization whereby the modulus of the subsequently cured product is increased.

4. The process which comprises heating and mixing within the range of about 300° F.–370° F. for a time within the range of about one to twelve minutes vulcanizable rubbery copolymer of at least 85% isobutylene and a small amount, not more than 15% of diolefin hydrocarbon, said copolymer having incorporated therein a small amount of N-(3-chloro-4-nitrosoanilinomethyl)phthalimide, any vulcanizing agents, if present, being present in amounts insufficient to cause vulcanization whereby the modulus of the subsequently cured product is increased.

References Cited in the file of this patent

UNITED STATES PATENTS

| 2,271,122 | Harmon | Jan. 27, 1942 |
| 2,616,876 | Rehner | Nov. 4, 1952 |
| 2,895,937 | Baldwin | July 21, 1959 |